United States Patent
Flatness et al.

(10) Patent No.: US 7,394,231 B2
(45) Date of Patent: *Jul. 1, 2008

(54) CURRENT-MODE CONTROL FOR SWITCHED STEP UP-STEP DOWN REGULATORS

(75) Inventors: Randy G. Flatness, Los Gatos, CA (US); Xunwei Zhou, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/052,480

(22) Filed: Feb. 8, 2005

(65) Prior Publication Data

US 2006/0176038 A1   Aug. 10, 2006

(51) Int. Cl.
*G05F 1/613* (2006.01)

(52) U.S. Cl. .................. 323/259; 323/225; 323/285

(58) Field of Classification Search .......... 323/285, 323/282, 222, 363, 259, 224, 225, 263, 284, 323/283; 363/17

See application file for complete search history.

(56) References Cited

U.S. PATENT DOCUMENTS

| | | | |
|---|---|---|---|
| 4,618,812 A | 10/1986 | Kawakami | |
| 5,001,621 A * | 3/1991 | Egawa | 363/132 |
| 5,134,355 A | 7/1992 | Hastings | |
| 5,481,178 A | 1/1996 | Wilcox et al. | |
| 5,552,694 A * | 9/1996 | Appeltans | 323/222 |
| 5,602,463 A * | 2/1997 | Bendall et al. | 323/266 |
| 5,734,258 A * | 3/1998 | Esser | 323/224 |
| 5,889,392 A * | 3/1999 | Moore et al. | 323/282 |
| 6,087,816 A | 7/2000 | Volk | |
| 6,166,527 A * | 12/2000 | Dwelley et al. | 323/222 |
| 6,191,567 B1 * | 2/2001 | Sluijs | 323/259 |
| 6,215,286 B1 * | 4/2001 | Scoones et al. | 323/222 |
| 6,275,016 B1 * | 8/2001 | Ivanov | 323/224 |
| 6,348,779 B1 * | 2/2002 | Sluijs | 323/222 |
| 6,411,531 B1 | 6/2002 | Nork et al. | |
| 6,522,116 B1 * | 2/2003 | Jordan | 323/288 |
| 6,580,258 B2 | 6/2003 | Wilcox et al. | |
| 6,611,131 B2 * | 8/2003 | Edwards | 323/282 |
| 6,636,431 B2 * | 10/2003 | Seki et al. | 363/65 |
| 6,737,838 B2 * | 5/2004 | Sluijs et al. | 323/225 |
| 6,765,371 B2 * | 7/2004 | Kataoka | 323/222 |

(Continued)

OTHER PUBLICATIONS

Maxim Step-Up/Step-Down Li+ Battery Charger, Maxim Integrated Products, MAX1870 A, pp. 1-32.

(Continued)

*Primary Examiner*—Jeffrey L. Sterrett
*Assistant Examiner*—Harry Behm
(74) *Attorney, Agent, or Firm*—McDermott Will & Emery LLP

(57) ABSTRACT

A switched regulator circuit provides step-up and step-down operation in which the level of the input voltage can be greater, equal to, or less than a preset controlled output voltage. A four switch arrangement or two switch arrangement provides buck, boost, and buck-boost regulation under constant frequency valley-peak current mode control. A single sense resistor may be utilized for sensing inductor current during only a short period during each duty cycle. As an alternative to the sense resistor, the switches themselves can be used to sense current during operation.

12 Claims, 16 Drawing Sheets

U.S. PATENT DOCUMENTS

| | | | |
|---|---|---|---|
| 6,781,352 B2 * | 8/2004 | Athari et al. | 323/222 |
| 6,812,676 B2 * | 11/2004 | Tateishi | 323/225 |
| 6,859,020 B2 * | 2/2005 | Baldwin et al. | 323/283 |
| 6,977,488 B1 * | 12/2005 | Nogawa et al. | 323/271 |
| 6,984,967 B2 * | 1/2006 | Notman | 323/282 |
| 7,256,570 B2 * | 8/2007 | Zhou et al. | 323/224 |
| 2002/0145409 A1 | 10/2002 | Umminger et al. | |
| 2004/0239299 A1 * | 12/2004 | Vinciarelli | 323/282 |
| 2005/0195622 A1 * | 9/2005 | Lehman et al. | 363/17 |
| 2006/0055384 A1 * | 3/2006 | Jordan et al. | 323/282 |
| 2006/0176036 A1 * | 8/2006 | Flatness et al. | 323/282 |
| 2006/0176037 A1 * | 8/2006 | Flatness et al. | 323/282 |

OTHER PUBLICATIONS

Redl, Richard., et al. "What a Design Engineer Should Know About Current-Mode Control." Design Automation Inc. pp. 18-33.

"Modeling, Analysis and Compensation of the Current-Mode Converter,"Unitrode Application Note, U-97, Applications Handbook 1997 Edition, pp. 3-43-3-48.

"Micropower Synchronous Buck-Boost DC/DC Converter." Linear Technology, LTC3440, pp. 1-16

"No $R_{SENSE}$ Synchronous Step-Up DC/DC Controller." Linear Technology, LTC1700, pp. 1-16.

"High Efficiency Synchronous Step-Down Switching Regulator." Linear Technology, LTC1735, pp. 1-32.

* cited by examiner

CURRENT-MODE CONTROL FOR SWITCHED STEP UP-STEP DOWN REGULATORS

RELATED APPLICATIONS

This application contains subject matter related to copending U.S. application Ser. No. 11/052,478 of Flatness et al., filed Feb. 8, 2005, copending U.S. application Ser. No. 11/052,477 of Flatness et al., filed Feb. 8, 2005, and copending U.S. application Ser. No. 11/052,473 of Flatness et al., filed Feb. 8, 2005, all commonly assigned with the present application. The disclosures of these applications are incorporated by reference herein.

TECHNICAL FIELD

The present disclosure relates to control of regulators, more particularly to switched regulators that can be operated in a boost mode, a buck mode and a buck-boost mode.

BACKGROUND

Voltage regulators are known that can convert from input voltages above, below, or equal to the controlled output voltage, respectively performing buck mode regulation, boost mode regulation, or buck-boost mode regulation. Regulator architecture typically is provided for power supplies for automotive applications, lap-top computers, telecom equipment and distributed power systems. A known "four-switch" buck-boost converter is described in an October 2001 datasheet for the LTC3440 "Micro-power Synchronous Buck-Boost DC/DC Converter" integrated circuit manufactured by Linear Technology Corporation. Two of the four switches are connected to the input side of an inductor, the other switches connected to the output side. In accordance with the level of voltage output to be controlled and the level of voltage input, the regulator has the capability of assuming a plurality of operation states in which the switches variously are sequentially activated or deactivated, to connect the inductor to the input, the output, and/or a common ground connection. The voltage mode control technique used presents difficulty in compensating for boost and buck-boost mode closed loop operation.

Other known arrangements are simplifications of the "four-switch" configuration in which two of the switches are replaced by diodes. With such arrangements, control flexibility is lessened as fewer different switch operation states are available. A variable frequency control technique can be used to apply constant-on time control for buck mode and constant-off time control for boost mode. This technique utilizes a wide switching frequency range and a very low system bandwidth. Another known alternative uses current mode control, wherein a sense resistor is placed permanently in series with the circuit inductor or two sense resistors are used, one at the input and another at the output. Conduction loss is increased significantly by these provisions, as inductor current traverses a sense resistor at all times. A need thus exists for a buck-boost regulator that avoids the aforementioned disadvantages.

SUMMARY OF THE DISCLOSURE

The subject matter described herein fulfills the above-described needs of the prior art. In one aspect, a regulator circuit provides step-up and step-down operation in which the level of the input voltage can be greater, equal to, or less than a preset controlled output voltage. A first switch is connected between a first inductor terminal and an input terminal. A second switch is connected between a second inductor terminal and a common connection. A first rectifying device is connected between the first inductor terminal and the common connection. A second rectifying device is connected between the second inductor terminal and an output terminal. A sensing element for sensing inductor current is connected between the common connection and a node joining the second switch and the first rectifying device. A control circuit is responsive to sensed inductor current and a voltage proportional to the output for controlling activation and deactivation of the switches to regulate voltage at the output to a preset voltage.

The control circuit preferably includes comparator circuitry, logic circuits connected to receive input from the comparator circuitry, and switch driver circuitry responsive to the logic circuit for controlling the states of the switches. In the comparator circuitry, an error amplifier has a first input for receiving a voltage proportional to the voltage at the output terminal and a second input for receiving a reference potential to produce a difference signal. A differential circuit is responsive to the difference signal, and the sensed inductor current sensing element and produces an output to the logic circuits. A first circuit section of the differential circuit receives a signal output from the current sensing element of a first polarity and a second circuit section receives the signal output from the current sensing element with inverted polarity.

When the preset output voltage is greater than the input voltage the control circuit operates in a voltage boost mode. The first switch is maintained in an ideally closed state and the second inductor terminal is connected in succession alternately between a common potential, via the second switch in a closed state, and the output terminal, via the second rectifying device. The control circuit is coupled to a constant frequency clock source. The second switch is turned on upon receipt of each clock pulse and turned off in response to the sensed current rising to a reference threshold level. The second switch remains off for the remainder of the cycle, until the next clock pulse. Current is drawn through the sensing element only during the time period in which the second switch is conducting. The term "constant frequency operation" is intended to signify that switching is implemented in accordance with a constant frequency clock signal.

When the preset output voltage is less than the input voltage the control circuit operates in a voltage buck mode. The second switch is maintained in an open state and the first inductor terminal is connected in succession alternately between a common potential, via the first rectifying device, and the input terminal, via the first switch in a closed state. The first switch is turned off upon receipt of each clock pulse and turned on in response to the sensed current falling to a reference threshold level. The first switch remains on for the remainder of the cycle. Current is drawn through the sensing element only during the time period in which the first switch is not conducting.

When the input voltage is approximately the same as the preset output voltage the control circuit operates in a voltage buck-boost mode in which both the first switch and the second switch are individually controlled and the first switch is in a closed state a majority of the time during cycled operation. When the input voltage is slightly greater than or the same as the preset output voltage, the first switch is turned off at the beginning of each cycle, followed by a brief turn on of the second switch. If the control circuit is coupled to a clock source for constant frequency operation, the first switch is turned off in response to receipt of each clock signal.

When the input voltage is slightly less than or the same as the preset output voltage, the second switch is turned on at the beginning of each cycle, followed by a brief turn off of the first switch. If the control circuit is coupled to a clock source for constant frequency operation, the second switch is turned on in response to receipt of each clock signal.

In another aspect of the disclosure, a first switch of the regulator is connected between the first inductor terminal and the input terminal, a second switch is connected between the first inductor terminal and the common connection, a third switch is connected between the second inductor terminal and the common connection, and a fourth switch is connected between the second inductor terminal and the output terminal. Activation and deactivation of the switches are controlled by a control circuit to regulate voltage at the output to a preset voltage. A logic circuit receives input from comparator circuitry to produce signals to switch driver circuitry for controlling the states of the switches. An error amplifier receives at one input a voltage proportional to the voltage at the output terminal and at a second input a reference potential to produce a difference signal. A differential circuit, responsive to the difference signal and the inductor current sensing element, is connected to the logic circuit. A first circuit section of the differential circuit receives a signal output from the current sensing element and a second circuit section of the differential circuit receives the signal output from the current sensing element with inverted polarity. The four switches are controlled in response to the sensed inductor current and a voltage proportional to the output voltage.

When the preset output voltage is greater than the input voltage the control circuit operates in a boost mode. The first switch is maintained in an ideally closed state and the second switch is maintained in an ideally open state. The inductor is connected in succession alternately between a common potential, via the third switch in a closed state, and the output terminal, via the fourth switch in a closed state. The third switch is turned on upon receipt of each clock pulse and turned off in response to the sensed current rising to a reference threshold level. The third switch remains off for the remainder of the cycle, until the next clock pulse. Current is drawn through the sensing element only during the time period in which the second switch is conducting.

When the preset output voltage is less than the input voltage the control circuit operates in a voltage buck mode. The third switch is maintained in an open state and the fourth switch is maintained in an ideally closed state. The inductor is connected in succession alternately between a common potential, via the second switch in a closed state, and the input terminal, via the first switch in a closed state. The first switch is turned off upon receipt of each clock pulse and turned on in response to the sensed current falling to a reference threshold level. The first switch remains on for the remainder of the cycle. Current is drawn through the sensing element only during the brief time period in which the first switch is not conducting.

When the input voltage is approximately the same as the preset output voltage the control circuit operates in a voltage buck-boost mode. The first switch and the second switch are controlled to be in reciprocal conductive states with respect to each other and the third switch and the fourth switch are controlled to be in reciprocal conductive states with respect to each other. The first and fourth switches are in a closed state a majority of time during operation. When the input voltage is slightly greater than, or the same as, the preset output voltage, the second and fourth switches are turned on at the beginning of each cycle, followed by a brief turn on of the first and third switches. The second and fourth switches are turned on in response to receipt of each clock signal.

When the input voltage is slightly less than or the same as the preset output voltage, the first and third switch are turned on at the beginning of each cycle, followed by a brief turn on of the second and fourth switch. The first and third switches are turned on upon receipt of each clock pulse. An advantage of the disclosed arrangements is that switch over between buck and boost modes can be made automatically with very short transition times.

In another aspect of the disclosure, current mode regulation is carried out with the use of a single current sensing element. The element may be connected in series with the inductor between the first and fourth switches in the four switch implementation or between the first switch and the second switch in the two switch implementation. Alternatively, the single current sensing element may connected directly between the common node and a junction of the second and third switches in the four switch implementation or a junction of the first rectifying device and the second switch in the two switch implementation. In these latter implementations, the current sensing element conducts current only during a portion of the control cycle, thereby conserving power.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1:
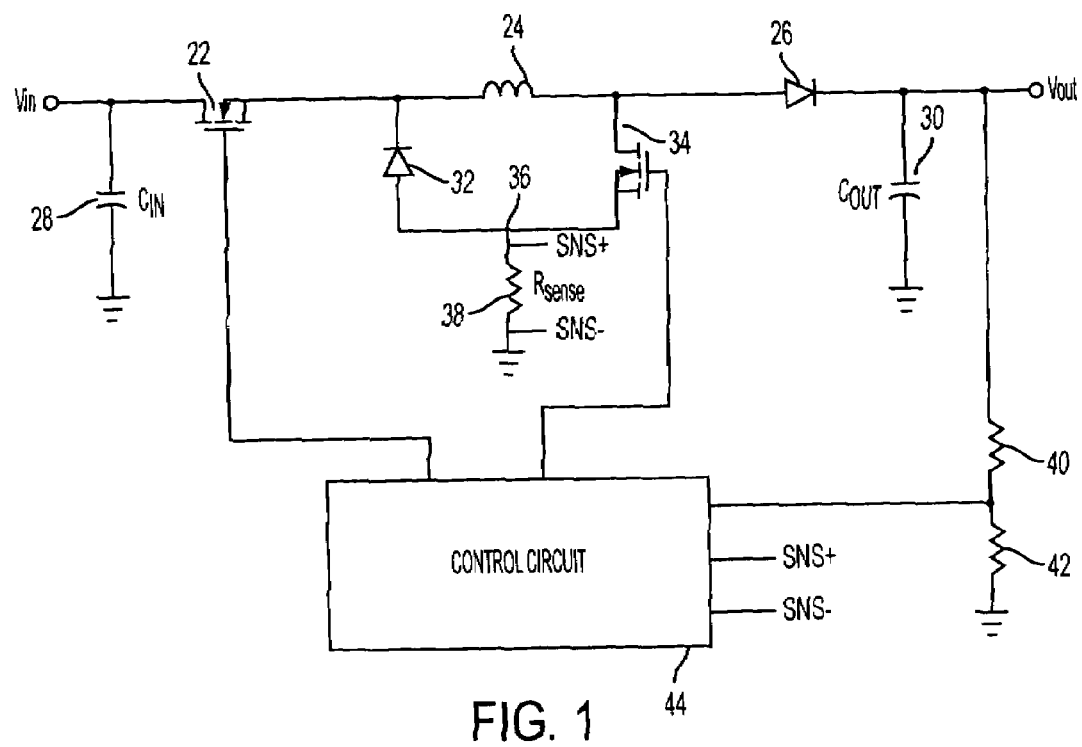
FIG. 1 is a schematic block diagram of a switching regulator in accordance with one embodiment of the present invention.

A switching regulator is represented in the schematic block diagram of FIG. 1. An input voltage from a power supply is applied to input terminal $V_{in}$. A preset output voltage is regulated at the $V_{out}$ terminal. Connected in series between the input and output terminals are a first switch 22, inductor 24, and rectifier 26. Rectifier 26 is connected to conduct current in the direction of the output terminal. Switch 22 preferably is a MOSFET, although any controlled switching device may be utilized.

An input capacitor 28 is connected between the input terminal and the common ground. An output capacitor 30 is connected between the output terminal and the common ground. Rectifier 32 and a second switch 34 are connected across inductor 24 and joined at node 36. Rectifier 32 is connected to conduct current in the direction of the inductor 24. Current sense resistor 38 is connected between node 36 and the common ground. Voltage divider resistors 40 and 42 are connected in series between the output terminal and the common ground.

Control circuit 44 has a first input connected to the junction between resistors 40 and 42, thereby to receive an output feedback voltage at resistor 42. The voltage at resistor 42 is proportional to the output voltage. A second input to control circuit 44 receives the voltage across resistor 38, which represents sensed inductor current. In response to these inputs, the control circuit 44 outputs signals for activation and deactivation of switches 22 and 34 for the various modes of operation.

Figure 2:
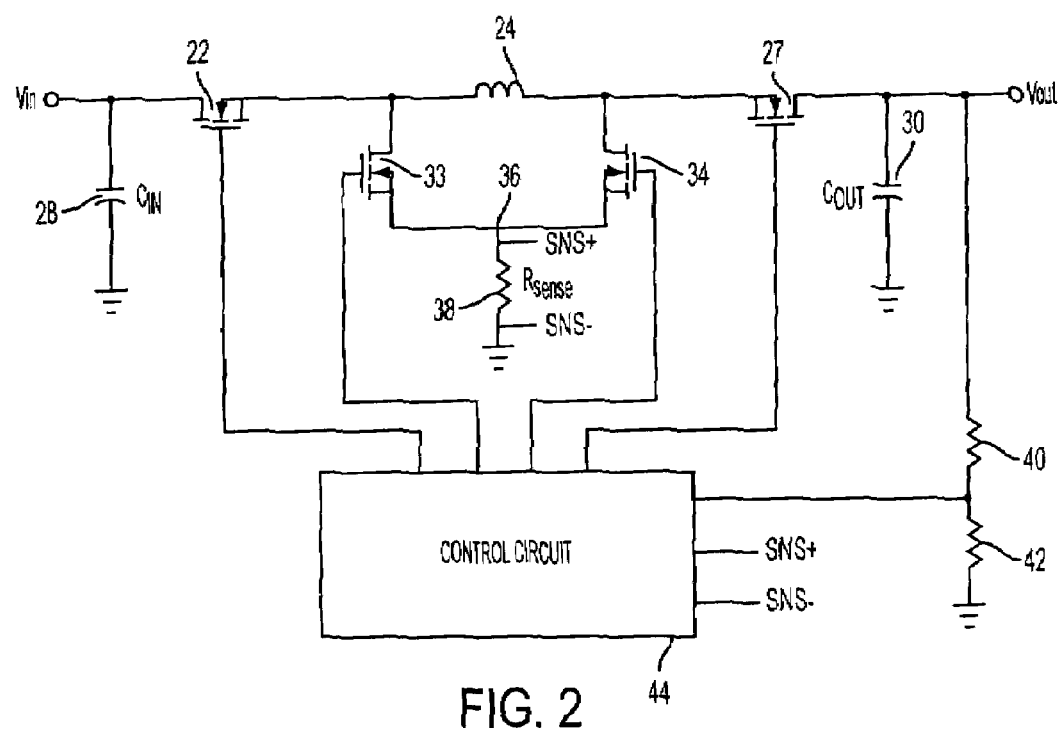
FIG. 2 is a schematic block diagram of a switching regulator in accordance with another embodiment of the present invention.

The switching regulator of FIG. 2 differs from the regulator of FIG. 1 in that switch 27 is connected in place of rectifier 26 and switch 33 is connected in place of rectifier 32. Switches 22 and 33 are controlled to be in reciprocal conductive states with respect to each other and switches 27 and 34 are controlled to be in reciprocal conductive states with respect to each other.

Each of the switching regulators of FIGS. 1 and 2 is capable of providing efficient operation in a buck mode, wherein the input voltage is greater than a preset output voltage, a boost mode, wherein the input voltage is less than a preset output voltage, and a buck-boost mode, wherein the input voltage and preset output voltage are of substantially the same level.

Figure 3A:
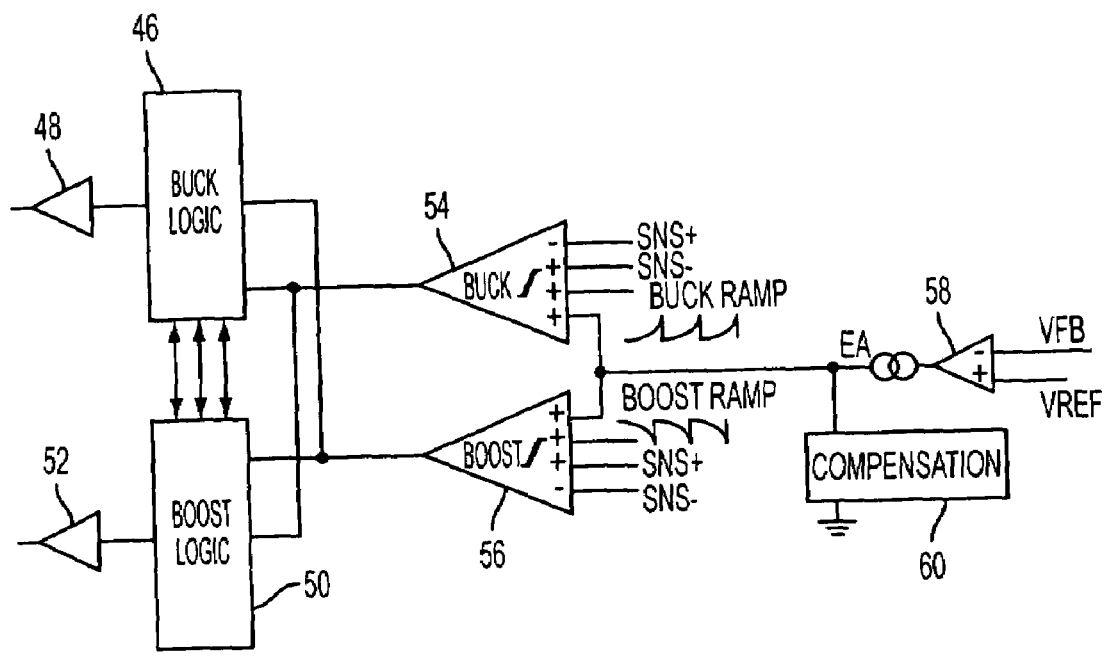
FIGS. 3a and 3b are block diagrams of the current mode control circuits corresponding, respectively, to FIGS. 1 and 2.

FIG. 3a is a block diagram of the control circuit 44 of FIG. 1. An output of buck logic circuit 46 is connected to switch driver 48, which applies gate driving signals to controlled switch 22. An output of boost logic circuit 50 is connected to switch driver 52, which applies gate driving signals to controlled switch 34. An output of buck comparator 54 is connected to an input of buck logic circuit 46 and an input of boost logic 50. An output of boost comparator 56 is connected to an input of buck logic circuit 46 and an input of boost logic 50. Error amplifier 58 outputs a signal corresponding to the difference between the output feedback voltage, taken at the junction between resistors 40 and 42, and a reference voltage.

This difference signal is applied as an input to buck comparator 54 and boost comparator 56. A buck compensation ramp signal and a boost compensation ramp signal are produced and applied, respectively, to an input of the buck comparator 54 and the boost comparator 56. A compensation circuit 60 is shown connected to the error amplifier output. The compensation circuits may comprise a well-known resistive capacitive arrangement for this purpose, as described, for example, in an article entitled *Modelling, Analysis and Compensation of the Current-Mode Converter*, published in the 1997 edition of Applications Handbook. The compensated error signal and ramp signal are superimposed and compared by the comparators with the sensed current signal SNS+ SNS−, taken across current sense resistor 38 and applied as additional inputs to the comparators.

Figure 3B:
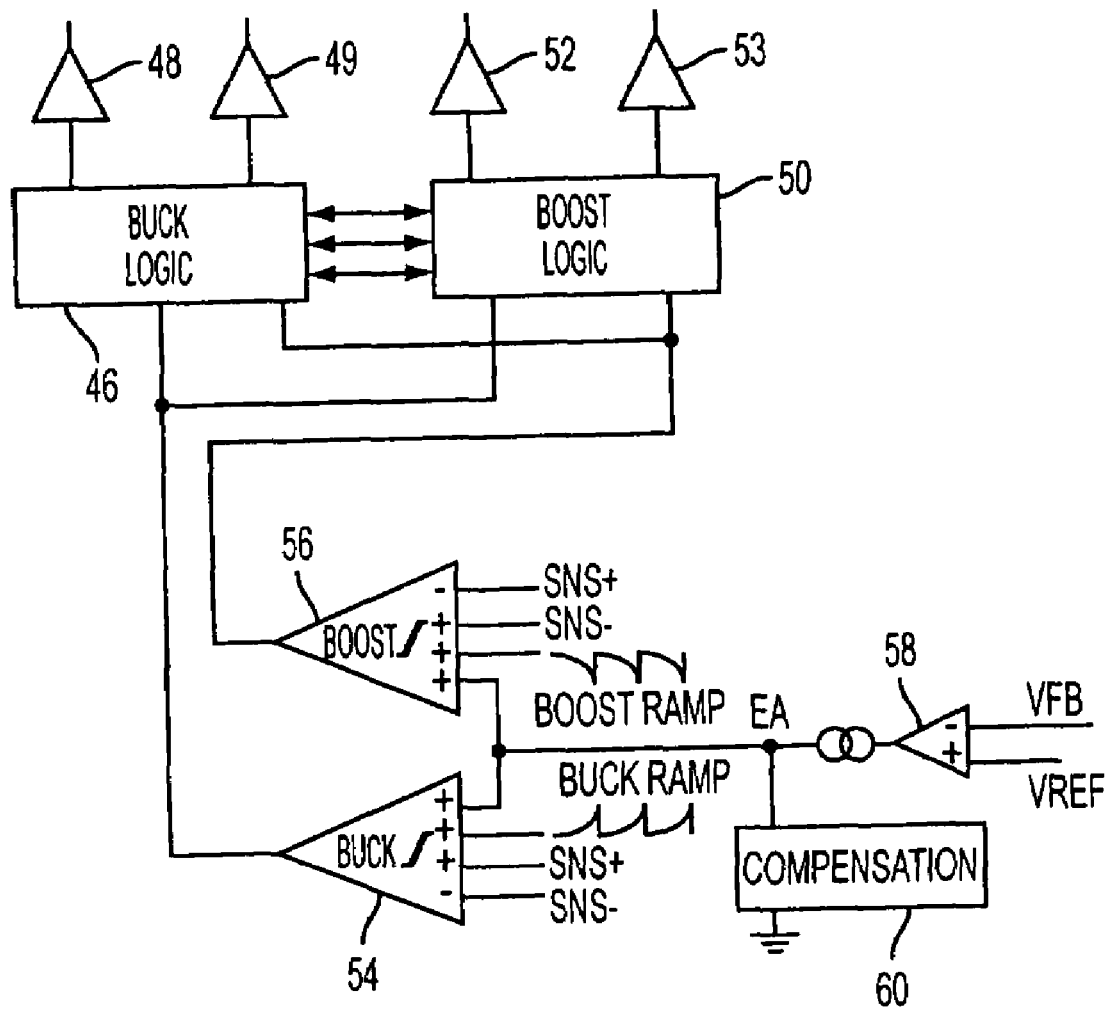

FIG. 3b is a block diagram of the control circuit 44 of FIG. 2. The buck logic circuit 46 outputs signals to switch drivers 48 and 49 that apply driving signals, respectively, to switches 22 and 33. The boost logic circuit 50 outputs signals to switch drivers 52 and 53 that apply driving signals, respectively, to switches 34 and 27. Operation of the control circuit is explained more fully below with respect to the waveforms and flow chart that follow.

Figure 4A:
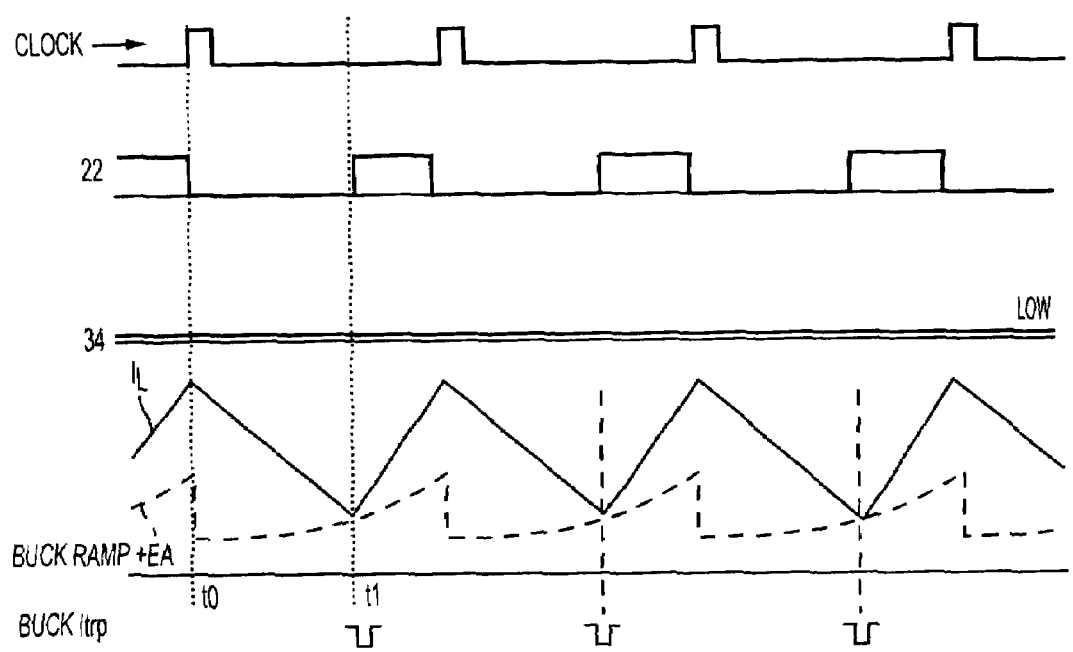
FIG. 4a is a waveform diagram for buck mode operation of the regulator of FIG. 1.
Figure 4B:
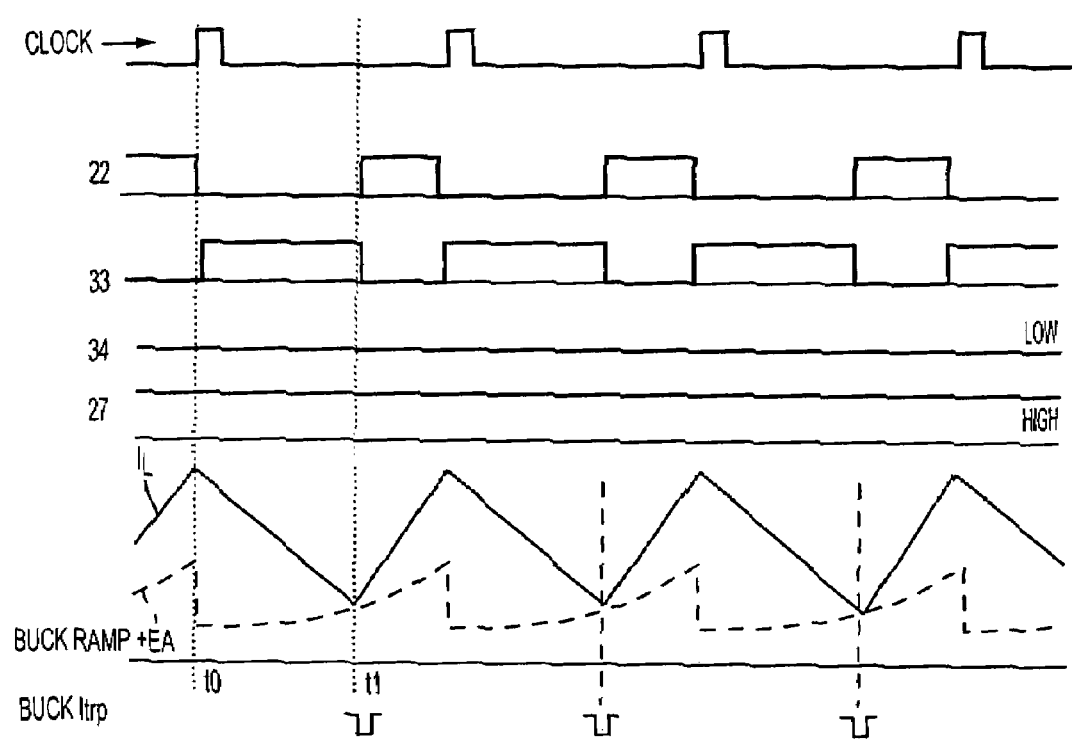
FIG. 4b is a waveform diagram for buck mode operation of the regulator of FIG. 2.

Switch controlled operation in buck mode is illustrated by the waveform diagrams of FIGS. 4a and 4b. In the buck mode, the output voltage is regulated to a preset level that is lower than the input voltage. To maintain the preset output voltage, current is applied by the regulator to the output capacitor $C_{OUT}$ at a rate that is controlled in dependence upon the sensed conditions. Buck logic circuit 46 outputs signals for turning on and off switch 22 in response to the output of buck comparator 54, while boost logic circuit 50 maintains switch 34 off throughout the boost mode operation. Boost comparator 56 is disabled at this time.

Waveforms for constant frequency control of the regulator of FIG. 1 are shown in FIG. 4a. At time $t_0$, a clock pulse initiates a cycle. Prior to $t_0$, switch 22 is in an on state to complete a current path between the input terminal and the output terminal via inductor 24 and rectifier 26. The inductor current $I_L$ is at a relatively high level. Switch 22 is deactivated and both switches are now in an off state. As there remains stored energy in the inductor, current continues to flow in the same direction in a path between the common ground and the output terminal that includes sense resistor, 38 rectifier 32, inductor 24 and rectifier 26. Current flows at a decreasing rate as energy stored in the inductor dissipates. The voltage at resistor 38, which is indicative of sensed inductor current, is an input to the buck comparator 54 of control circuit 44.

At $t_1$, the current falls to a "valley" threshold level set by the combined buck compensation ramp and the output of error amplifier 58. In response to a change in the output of comparator 54, buck logic circuit 46 generates an output signal to switch driver 48 to activate switch 22. The inductor again is connected between the input terminal and output terminal. As rectifier 32 is connected to prevent current flow from the input terminal to resistor 38, current through the inductor increases until switch 22 is deactivated at the next clock pulse. Switch 34 has remained in the off state throughout the control cycle. Control continues in this manner at constant frequency.

Buck mode operation of the regulator of FIG. 2 is illustrated in FIG. 4b. Switch 34 is maintained in an off state and switch 27 is in a dominantly on state by boost logic circuit 50 throughout buck operation. At $t_0$, a clock pulse is received, switch 22 is set to an off state, and switch 33 is turned on by buck logic circuit 46. Current flows at a decreasing rate between the common ground and the output terminal via sense resistor 38, switch 33 inductor 24, and switch 27. The current falls to a "valley" threshold level at time $t_1$. In response to the sensed current level as determined by buck comparator 54, buck logic circuit 46 generates signals to turn on switch 22 and turn off switch 33 via switch drivers 48 and 49. The inductor again is connected between the input terminal and output terminal and remains so connected until the next clock pulse.

The above-described buck mode operation is implemented with clocked constant frequency switching control. Constant frequency simplifies the design of input and output filters and compensation circuit.

Figure 5A:
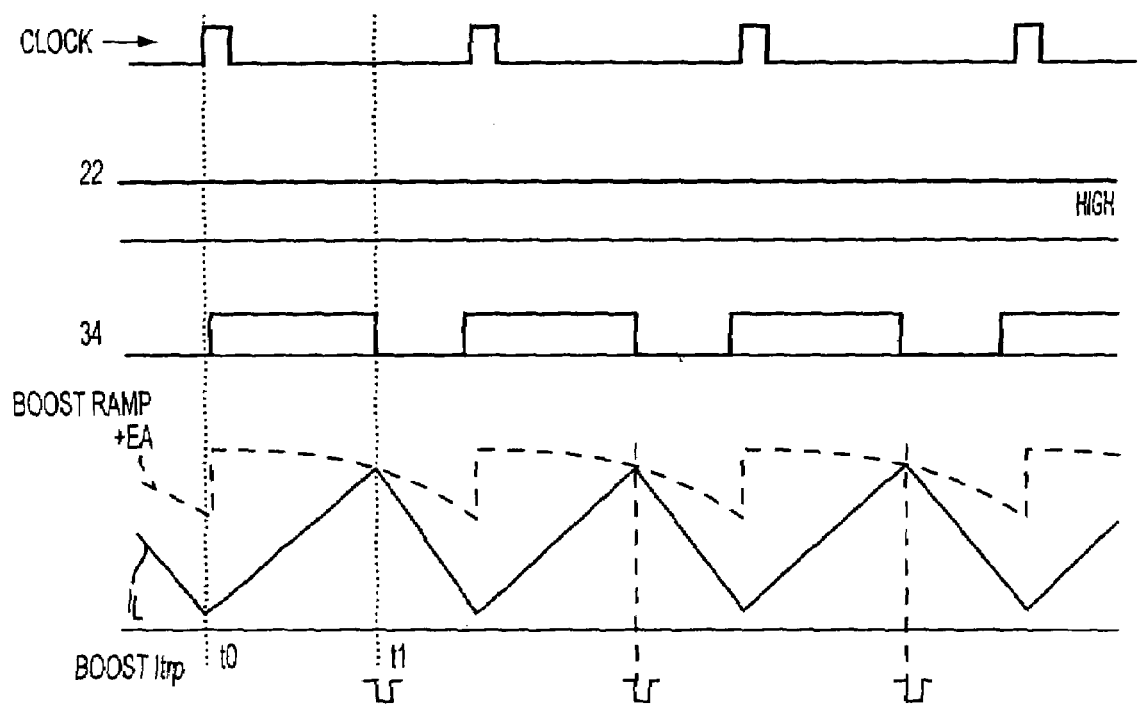
FIG. 5a is a waveform diagram for boost mode operation of the regulator of FIG. 1.
Figure 5B:
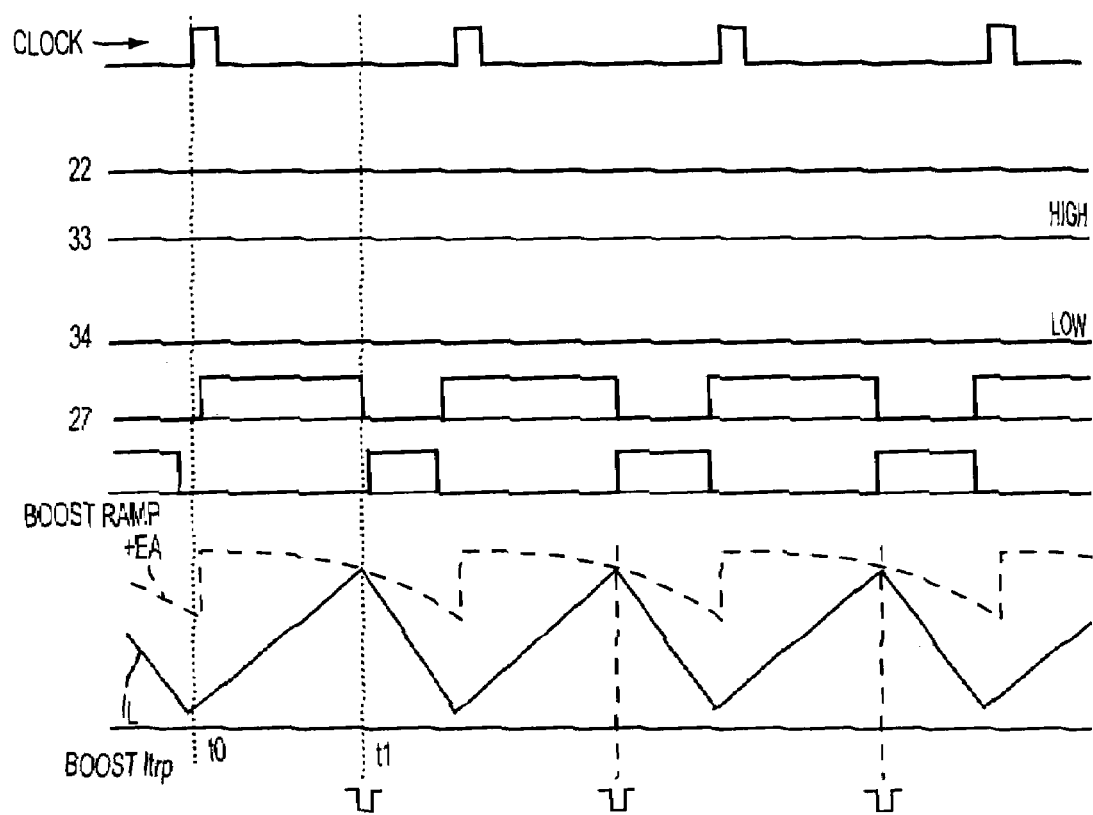
FIG. 5b is a waveform diagram for boost mode operation of the regulator of FIG. 2.

Constant frequency boost mode operation for the regulators of FIGS. 1 and 2 is illustrated by the waveforms of FIGS. 5a and 5b, respectively. In each regulator, switch 22 is maintained in a dominantly on state throughout the boost mode operation by buck logic circuit 46. In the regulator of FIG. 2, switch 33 is maintained in an off state throughout the boost mode operation. Buck comparator 54 is disabled throughout boost mode operation. At $t_0$, a clock pulse is received and the regulators are switched to a configuration in which the inductor is connected between the input terminal and the comment ground terminal to draw current from the power source. This configuration is obtained in the regulator of FIG. 1 by turning on switch 34 and in the regulator of FIG. 2 by turning on switch 34 and turning off switch 27. The rising inductor current is sensed by resistor 38 and reaches a peak threshold value at time $t_1$. In each regulator, switch 34 is then turned off, and in the regulator of FIG. 2 switch 27 is turned on, thereby to connect the inductor between the input terminal and the output terminal. The inductor remains so connected until the next clock pulse.

Figure 6A:
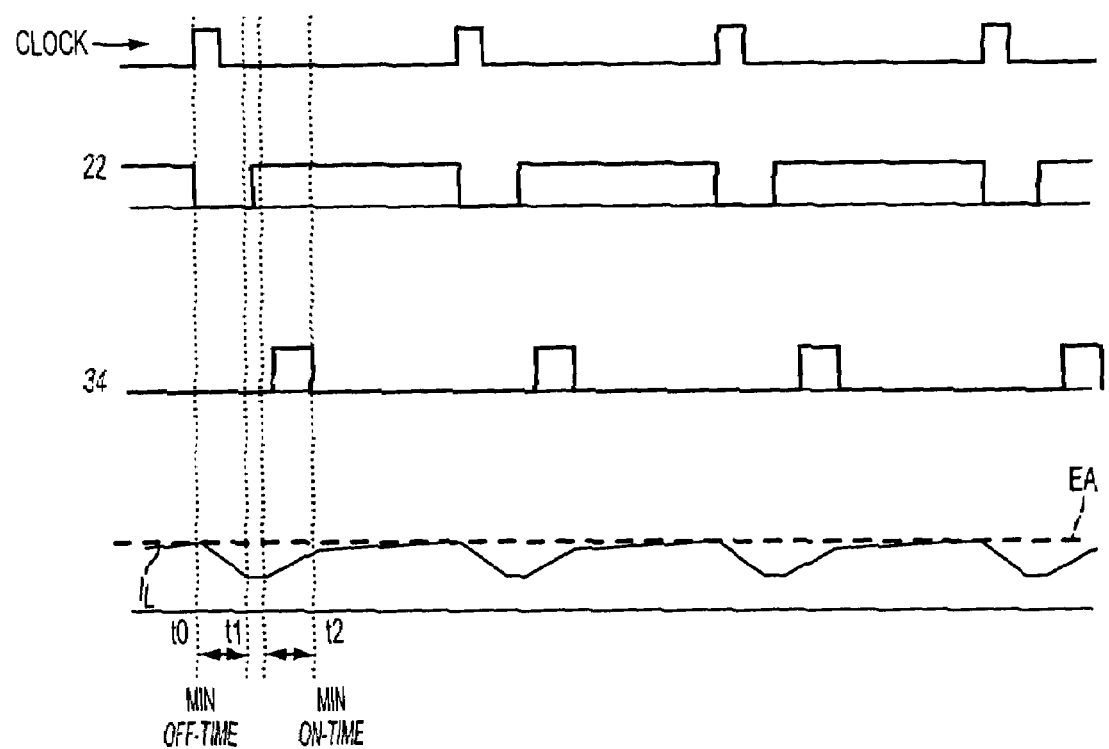
FIG. 6a is a waveform diagram for buck/boost mode operation of the regulator of FIG. 1 when voltage input is equal to or slightly greater than the controlled output voltage.
Figure 6B:
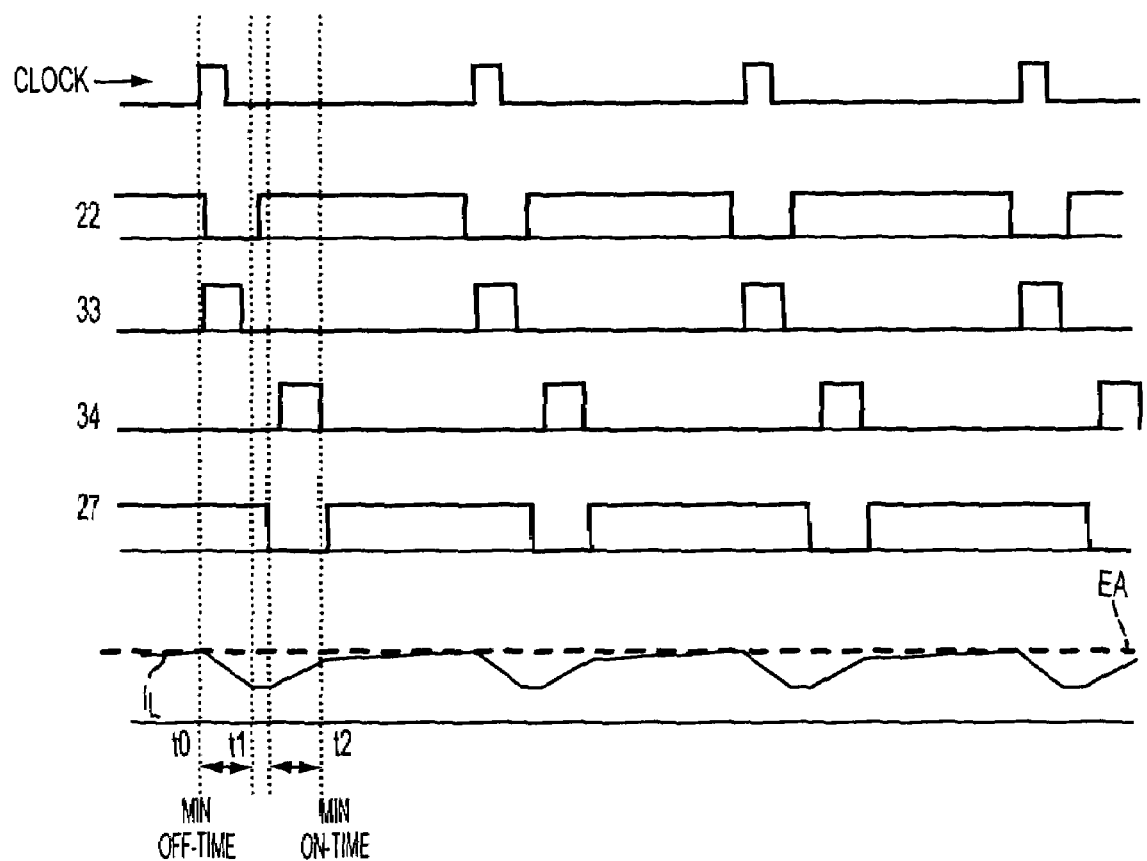
FIG. 6b is a waveform diagram for buck/boost mode operation of the regulator of FIG. 2 when voltage input is equal to or slightly greater than the controlled output voltage.

When the input voltage is approximately the same as the preset output voltage the regulators of FIG. 1 and FIG. 2 operate in a buck-boost current control mode. FIGS. 6a and 6b show typical waveforms for this mode, wherein the input voltage is slightly higher than, or equal to, the output voltage. When a buck mode condition exists, the boost comparator 56 is temporarily disabled, and the buck comparator 54 enabled, for a time period in which the buck logic circuit 46 and boost logic circuit 50 are operative in buck mode as described heretofore. FIG. 6a shows waveforms representative of the two switch regulator of FIG. 1; FIG. 6b shows waveforms representative of the four switch regulator of FIG. 2. In each cycle, the inductor is connected in three different configurations.

At $t_0$, a clock pulse is received and both regulators are controlled to connect the inductor between the common ground and the output terminal. Switches 22 and 34 of each regulator are both in the off state. Switches 33 and 27, of the four switch regulator of FIG. 2, are both in the on state. The decreasing inductor current in the path between the common ground and the output terminal is sensed by resistor 38. At time $t_1$, the current has fallen to the valley threshold and control circuit 44 sets switches 22 and 34 on and sets switches 33 and 27 off. The inductor is now connected between the voltage input terminal and the common ground, causing the inductor current to increase. Operation is now temporarily in a boost mode in which boost comparator 56 is enabled and buck comparator 54 is disabled. At $t_2$, the current has risen to a second threshold and the control circuit sets switch 22 on, switch 34 off, switch 33 off and switch 27 on. The switches remain in this configuration until the next clock pulse.

Figure 7A:
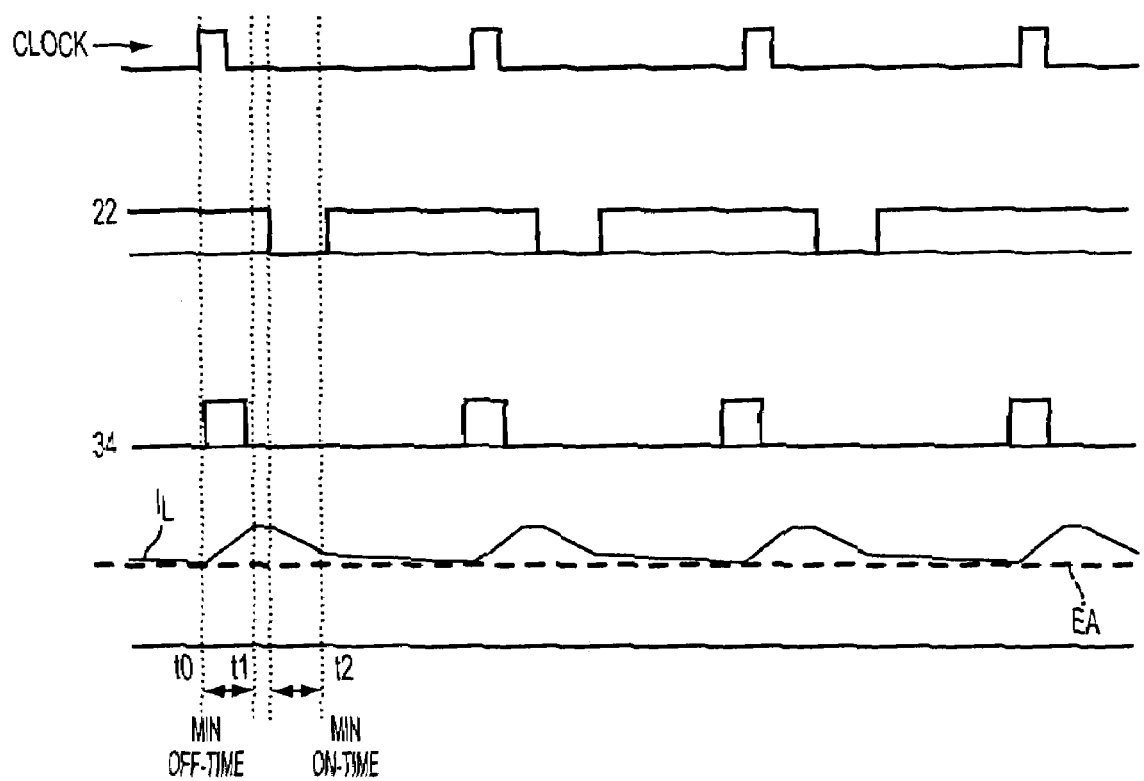
FIG. 7a is a waveform diagram for buck/boost mode operation of the regulator of FIG. 1 during conditions in which the voltage input is equal to or slightly less than the controlled output voltage.
Figure 7B:
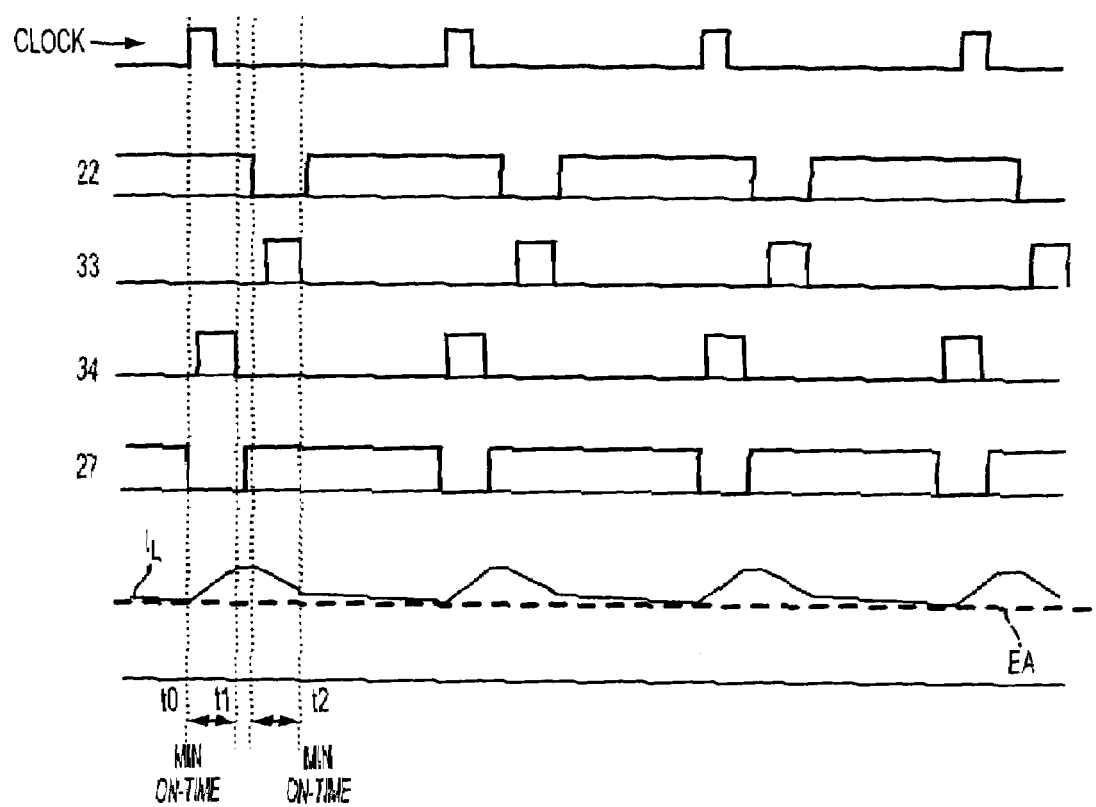
FIG. 7b is a waveform diagram for buck/boost mode operation of the regulator of FIG. 2 during conditions in which the voltage input is equal to or slightly less than the controlled output voltage.

Waveforms for buck-boost mode operations when the input voltage is slightly lower than, or equal to, the output voltage are shown for the two switch regulator of FIG. 1 and the four switch regulator of FIG. 2, respectively, in FIGS. 7a and 7b. At the start of the cycle, operation is in the boost mode, with boost comparator 56 enabled and buck comparator 54 disabled. In each cycle, the inductor is connected in three different configurations. At $t_0$, a clock pulse is received and both regulators are controlled to connect the inductor between the input terminal and the common ground. Switches 22 and 34 of each regulator are both set to the on state. Switches 33 and 27 are both in the off state. The increasing inductor current in the path between the input terminal and ground is sensed by resistor 38. At time $t_1$, the current has risen to a peak threshold and control circuit 44 sets switches 33 and 27 on and sets switches 22 and 34 off. The inductor is now connected between the common ground and the output terminal, causing the inductor current to decrease. A boost mode condition now temporarily exists in which the boost comparator 56 is enabled and the buck comparator 54 disabled. At $t_2$, the current has fallen to a second threshold level and the control circuit sets switches 22 and 27 on, and switches 33 and 34 off. The switches remain in this configuration until the next clock pulse.

As evident from the waveforms of FIGS. 6a and 6b, at the beginning of each cycle buck mode current valley sensing operation takes place, followed by boost mode peak current sensing. Operation for the waveforms of FIGS. 7a and 7b starts with boost mode peak current sensing, followed by buck mode valley current sensing in each cycle.

Whether buck-boost operation starts each cycle in buck mode or boost mode can be determined from the sensed current in the preceding cycle. For example, an operating cycle may start with a buck mode, such as illustrated in FIG. 6b, with switches 33 and 27 on, then change to boost mode, in which switches 22 and 34 are on, and then end the cycle with switches with 22 and 27 on. This operation occurs when the input voltage is equal to or slightly larger than the output voltage. If, within a minimum on-time of switch 34, the sensed inductor current stays lower than a reference level, the regulator will start the next cycle with boost mode operation before changing to buck mode. If, however, within the minimum on-time of switch 34, the sensed inductor current exceeds the reference level, the regulator will start the next cycle with buck operation before changing to boost mode operation.

Cycle starting mode operation determination when the input voltage is slightly less than or equal to the output voltage can be considered with respect to FIG. 7b. An operating cycle may start in boost mode, with switches 22 and 34 on, then change to buck mode, with switches 33 and 27 are on, and then end the cycle with switches with 22 and 27 on. If within a minimum on-time of switch 33, the sensed inductor current stays higher than a reference level, the regulator will start the next cycle with boost mode operation before changing to buck mode. If, however, within the minimum on-time of switch 33, the sensed inductor current is lower than the reference level, the regulator will start the next cycle with buck operation before changing to boost mode operation.

Figure 8:
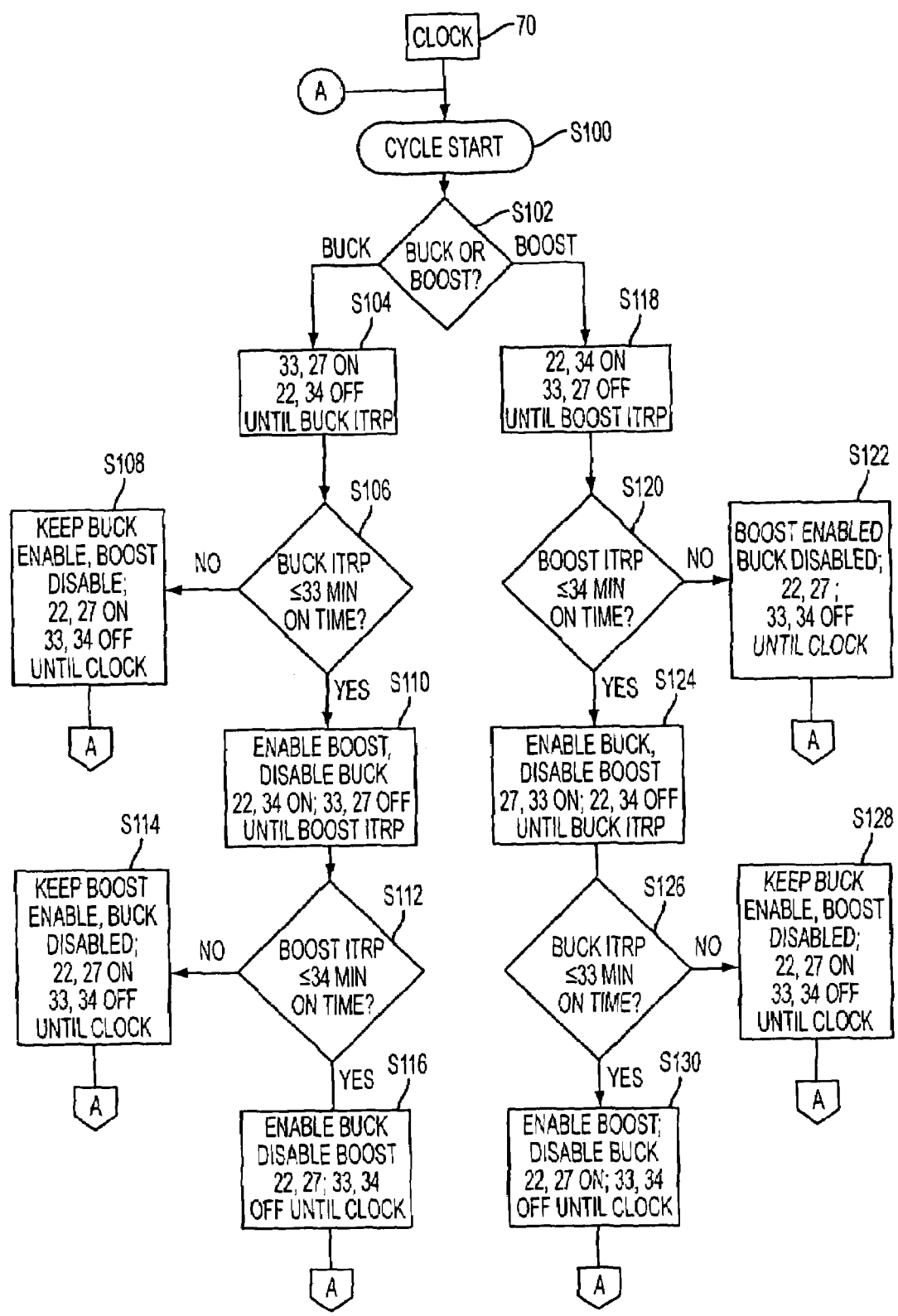
FIG. 8 is a flow chart illustrative of switching control for the various operations of regulator of FIG. 2.

FIG. 8 is a flow chart by which the control circuit performs the various constant frequency operations described above for the four switch configuration of FIG. 2. Step S100 begins each cycle in response to receipt of a clock signal from clock 70. At step S102, determination is made of whether operation is to be in the buck mode or boost mode at the beginning of the cycle. If the determination in this step is buck mode, the buck comparator is enabled and the boost comparator is disabled and operation proceeds to step S104. In this step, switches 33 and 27 are on and switches 22 and 34 are off until a buck interrupt signal is output by buck comparator 54. This signal is indicative that the inductor current has fallen to the valley threshold level and that a change in switch states is to occur.

At step S106, determination is made as to whether the buck interrupt signal is generated within a minimum on time of switch 33. If not, at step S108, buck enable and boost disable conditions are maintained with switches 22 and 27 maintained on and switches 33 and 34 maintained off from the occurrence of the buck interrupt signal until the next clock. The operation flow returns to step S100.

If determination is made at step S106 that the buck interrupt signal is generated within the minimum on time of switch 33, a buck-boost transition is indicated. At step S110, the boost comparator is enabled and the buck comparator disabled, switches 22 and 34 are turned on and switches 33 and 27 off until a boost interrupt signal is output by the boost comparator. This signal is indicative that the inductor current has risen to the peak threshold level and that a further change in switch states is to occur.

At step S112, determination is made as to whether the boost interrupt signal is generated within a minimum on time of switch 34. If not, at step S114, buck disable and boost enable conditions are maintained with switches 22 and 27 maintained on and switches 33 and 34 maintained off from the occurrence of the buck interrupt signal until the next clock. Operation flow then returns to step S100. The next cycle starts with operation in the boost mode.

If determination is made at step S112 that the boost interrupt signal is generated within the minimum on time of switch 33, at step S116 the buck comparator is enabled and the boost comparator disabled, switches 22 and 27 are maintained on and switches 33 and 34 maintained off until the next clock. Operation flow returning to step S100 and the next cycle starts with operation in the buck mode.

If a boost mode determination has been made in step S102, the boost comparator is enabled and the buck comparator is disabled and operation proceeds to step S118. Switches 22 and 34 are turned on and switches 33 and 27 are turned off until a boost interrupt signal is output by boost comparator 56. This signal is indicative that the inductor current has risen to the peak threshold level and that a change in switch states is to occur.

At step S120, determination is made as to whether the boost interrupt signal is generated within a minimum on time of switch 34. If not, at step S122, boost enable and buck disable conditions are maintained with switches 22 and 27 are maintained on and switches 33 and 34 maintained off from the occurrence of the boost interrupt signal until the next clock. The operation flow returns to step S100.

If determination is made at step S120 that the boost interrupt signal is generated within the minimum on time of switch 34, a buck-boost transition is indicated. At step S124, the buck comparator is enabled and the boost comparator disabled, switches 33 and 27 are maintained on and switches 22 and 34 maintained off until a buck interrupt signal is output by the buck comparator. This signal is indicative that the inductor current has fallen to the valley threshold level and that a further change in switch states is to occur.

At step S126, determination is made as to whether the buck interrupt signal is generated within a minimum on time of switch 33. If not, at step S128 buck enable and boost disable conditions are maintained with switches 22 and 27 on and switches 33 and 34 off from the occurrence of the buck interrupt signal until the next clock. Operation flow then returns to step S100. The next cycle starts with operation in the buck mode.

If determination is made at step S126 that the buck interrupt signal is generated within the minimum on time of switch 33, at step S130 the boost comparator is enabled and the buck comparator disabled, switches 22 and 27 are maintained on and switches 33 and 34 are maintained off until the next clock, operation flow returning to step S100. The next cycle starts with operation in the boost mode.

At step S102, determination of whether control is started in the buck or boost mode is made in accordance with enabled or disabled states of the buck and boost comparators as set previously by either step S108, step S114, step S116, step S122, step S128 or step S130. While the flow chart of FIG. 8 has been described specifically with respect to the four switch regulator implementation of FIG. 2, the process is the same for the two switch configuration of FIG. 1, whereby switches 22 and 34 are controllably activated and deactivated.

Figure 9:
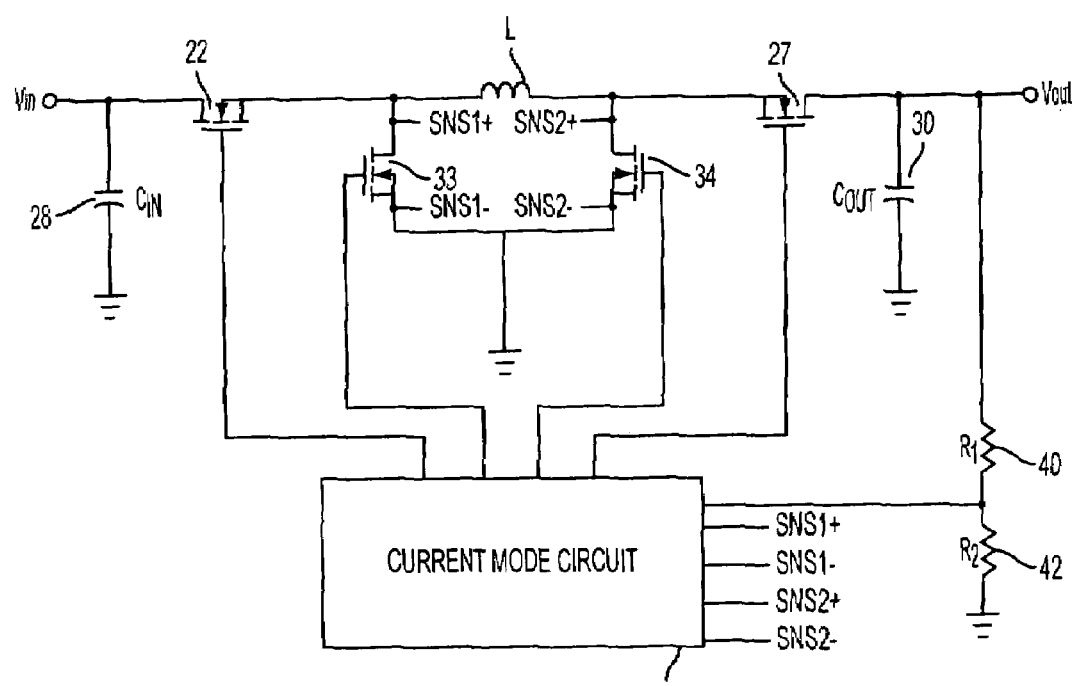
FIG. 9 is a schematic block diagram of a variation of the switching regulator of FIG. 2.
Figure 10:
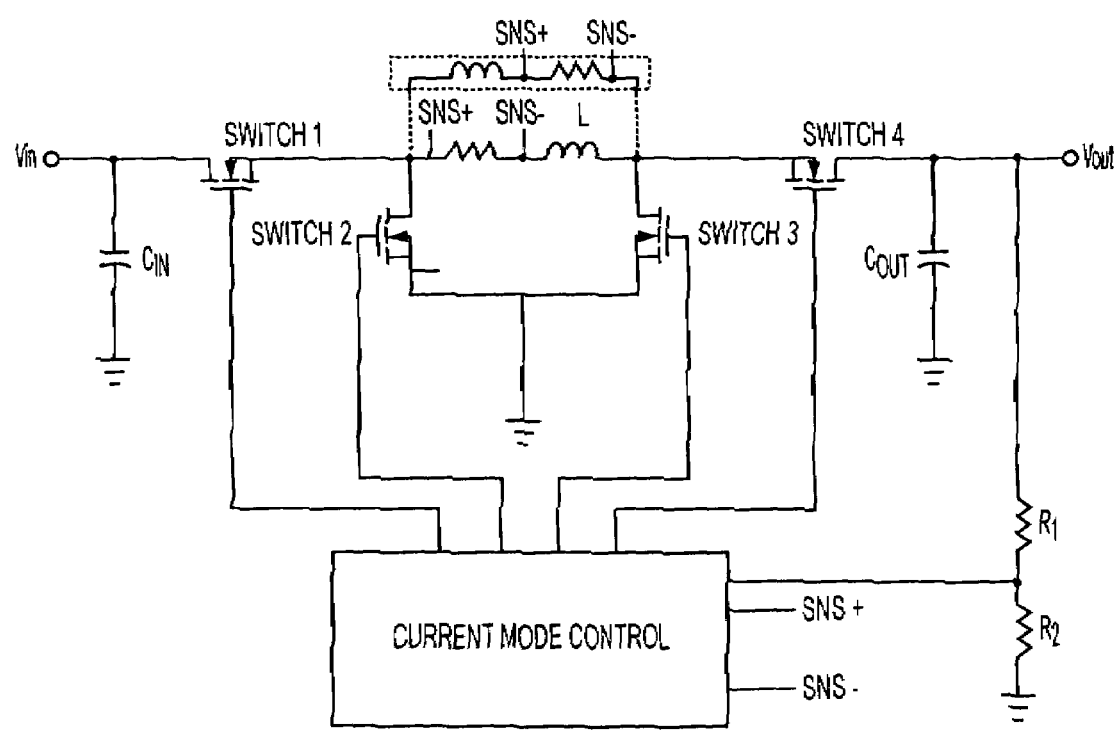
FIG. 10 is a schematic block diagram of another variation of the switching regulator of FIG. 2.
Figure 11:
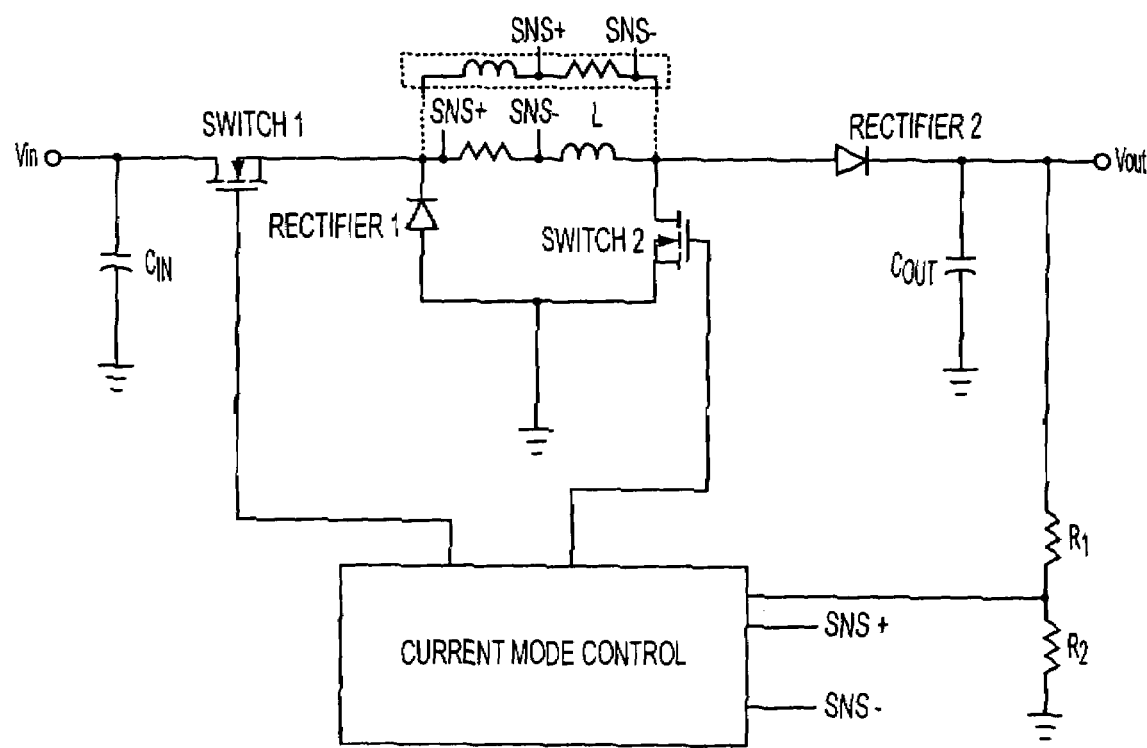
FIG. 11 is a schematic block diagram of a variation of the switching regulator of FIG. 1.

FIGS. 9-11 are variations of the regulator illustrations of FIGS. 1 and 2. FIG. 9 depicts a four switch regulator that differs from the regulator of FIG. 2 in that current sensing resistor 38 has been eliminated. In the above described controlled switching operations, current sensing is performed only when one or the other inductor terminal is connected to the common ground. As shown in FIG. 9, in lieu of the current sensing resistor 38, an inductor current sensing signal is derived from the sensed voltage drop across the conducting switch 33 or 34. FIGS. 10 and 11 depict, respectively, a four switch regulator and two switch regulator in which the sensing resistor is connected in series with the inductor between the input side switch and the output side switch. Operation of the regulators of FIGS. 9-11 otherwise is the same as described heretofore with respect to the waveforms and flow chart.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A regulator circuit for step-up and step-down operation having an input connectable to a power source and an output connectable to a load, the regulator circuit comprising:
    an inductor;
    a first controlled switch connected between a first inductor terminal and an input terminal;
    a second controlled switch connected between the first inductor terminal and a common connection;
    a third controlled switch connected between the second inductor terminal and the common connection;
    a fourth controlled switch connected between the second inductor terminal and an output terminal; and
    a control circuit coupled to a source of constant frequency clock cycles; wherein
    the control circuit is responsive to receipt of each clock pulse of the clock source to activate one of the controlled switches and deactivate another of the controlled switches and is responsive to current in the inductor attaining a current threshold during each clock cycle to reverse the switch activation and deactivation states for the remainder of the clock cycle.

2. A regulator circuit as recited in claim 1, wherein the control circuit comprises:
    comparator circuitry;
    a logic circuit connected to the comparator circuitry to receive input therefrom; and
    switch driver circuitry responsive to the logic circuit for controlling the states of the controlled switches.

3. A regulator circuit as recited in claim 2, wherein the comparator circuitry comprises:
    an error amplifier having a first input for receiving a voltage proportional to the voltage at the output terminal and a second input for receiving a reference potential to produce a difference signal representing the difference therebetween; and a differential circuit responsive to the difference signal and an inductor current sensing element, the differential circuit connected to the logic circuit.

4. A voltage regulator circuit as recited in claim 1, wherein the preset voltage is greater than the input voltage and the control circuit operates in boost mode wherein:

the third switch is turned on and the fourth switch is turned off upon receipt of each clock pulse, and the third switch is turned off and the fourth switch is turned on in response to the sensed current rising to a reference threshold level;

whereby the inductor is connected in succession alternately between a common potential, via the third switch in a closed state, and the output terminal, via the fourth switch in a closed state.

5. A regulator circuit as recited in claim 1, wherein the preset voltage is less than the input voltage and the control circuit operates in buck mode wherein:

the first switch is turned off and the second switch is turned on upon receipt of each clock pulse, and the first switch is turned on and the second switch is turned off in response to the sensed current falling to a reference threshold level;

whereby the inductor is connected in succession alternately between a common potential, via the second switch in a closed state, and the input terminal, via the first switch in a closed state.

6. A regulator circuit as recited in claim 1, further comprising a sensing element for sensing inductor current connected between the common connection and a node joining the second switch and the third switch.

7. A regulator circuit as recited in claim 1, wherein inductor current is sensed at either of the second and third switches.

8. A regulator circuit for step-up and step down operation having an input connectable to a power source and an output connectable to a load, the regulator circuit comprising:

an inductor;

a first switch connected between a first inductor terminal and an input terminal;

a second switch connected between the first inductor terminal and a common connection;

a third switch connected between the second inductor terminal and the common connection;

a fourth switch connected between the second inductor terminal and an output terminal; and a control circuit responsive to current in the inductor for controlling activation and deactivation of the switches to regulate voltage at the output to a preset voltage, wherein the control circuit comprises:

comparator circuitry;

a logic circuit connected to the comparator circuitry to receive input therefrom; and switch driver circuitry responsive to the logic circuit for controlling the states of the switches; and wherein the comparator circuitry comprises:

an error amplifier having a first input for receiving a voltage proportional to the voltage at the output terminal and a second input for receiving a reference potential to produce a difference signal representing the difference therebetween; and a differential circuit responsive to the difference signal and an inductor current sensing element, the differential circuit connected to the logic circuit; and wherein the differential circuit comprises a first circuit section for receiving a signal output from the current sensing element and a second circuit section for receiving the signal output from the current sensing element with inverted polarity.

9. A regulator circuit for step-up and step-down operation having an input connectable to a power source and an output connectable to a load, the regulator circuit comprising:

an inductor;

a first switch connected between a first inductor terminal and an input terminal;

a second switch connected between the first inductor terminal and a common connection;

a third switch connected between the second inductor terminal and the common connection;

a fourth switch connected between the second inductor terminal and an output terminal; and a control circuit responsive to current in the inductor and a voltage proportional to output voltage for controlling activation and deactivation of the switches to regulate voltage at the output to a preset voltage that is approximately the same as the input voltage during steady state buck-boost mode operation; wherein the first switch and the second switch are controlled to be in reciprocal conductive states to one another;

the third switch and the fourth switch are controlled to be in reciprocal conductive states to one another; and the first switch and the fourth switch are in a closed state for a majority of time during each operating cycle of cycled operation; and each operating cycle begins in response to a clock signal and, at the beginning of each cycle, the second and fourth switches are turned on for respective portions of the operating cycle followed by turn on of the first switch and turn on of the third switch for a brief portion of the same operating cycle prior to turn on of the fourth switch for the remainder of the same operating cycle.

10. A voltage regulator circuit as recited in claim 9, wherein the control circuit is coupled to a constant frequency clock source and wherein the second and fourth switches are turned on upon receipt of each clock pulse.

11. A regulator circuit for step-up and step-down operation having an input connectable to a power source and an output connectable to a load, the regulator circuit comprising:

an inductor;

a first switch connected between a first inductor terminal and an input terminal;

a second switch connected between the first inductor terminal and a common connection;

a third switch connected between the second inductor terminal and the common connection;

a fourth switch connected between the second inductor terminal and an output terminal; and a control circuit responsive to current in the inductor and a voltage proportional to output voltage for controlling activation and deactivation of the switches to regulate voltage at the output to a preset voltage that is approximately the same as the input voltage during steady state buck-boost mode operation; wherein the first switch and the second switch are controlled to be in reciprocal conductive states to one another;

the third switch and the fourth switch are controlled to be in reciprocal conductive states to one another; and the first switch and the fourth switch are in a closed state for a majority of time during each operating cycle of cycled operation; and each operating cycle begins in response to a clock signal and, at the beginning of each cycle, the first and third switch are turned on for respective portions of the operating cycle followed by turn on of the second switch for a brief portion of the same operating cycle and turn on of the fourth switch for the remainder of the same operating cycle.

12. A voltage regulator circuit as recited in claim 11, wherein the control circuit is coupled to a constant frequency clock source and wherein the first and third switches are turned on upon receipt of each clock pulse.

* * * * *